United States Patent
Chou et al.

(10) Patent No.: US 7,909,490 B2
(45) Date of Patent: Mar. 22, 2011

(54) LIGHTING APPARATUS

(75) Inventors: John Chou, Smithtown, NY (US);
Glenn T. Schmidt, Selden, NY (US);
Samuel Zeng, Flushing, NY (US); Amy Grumet-Avallone, Smithtown, NY (US);
Thomas Greenfield, Kings Park, NY (US); Jennifer L. Gloisten,
Farmingville, NY (US)

(73) Assignee: B/E Aerospace, Inc., Wellington, FL (US)

( * ) Notice: Subject to any disclaimer, the term of this patent is extended or adjusted under 35 U.S.C. 154(b) by 76 days.

(21) Appl. No.: 11/246,503

(22) Filed: Oct. 7, 2005

(65) Prior Publication Data
US 2007/0076415 A1 Apr. 5, 2007

Related U.S. Application Data

(60) Provisional application No. 60/617,411, filed on Oct. 8, 2004.

(51) Int. Cl.
*F21S 8/00* (2006.01)
*B60Q 1/06* (2006.01)
*F21V 21/00* (2006.01)
*F21L 4/00* (2006.01)
*F21L 4/04* (2006.01)

(52) U.S. Cl. ......... 362/427; 362/188; 362/198; 362/371

(58) Field of Classification Search ............... 362/427, 362/371, 188, 197–199, 402
See application file for complete search history.

(56) References Cited

U.S. PATENT DOCUMENTS

| | | | | |
|---|---|---|---|---|
| 1,279,803 | A | * | 9/1918 | Watson ................... 248/160 |
| 1,854,302 | A | | 4/1932 | Hansen |
| 4,178,626 | A | * | 12/1979 | Marcus ................... 362/133 |
| 4,511,954 | A | * | 4/1985 | Marcus et al. .......... 362/492 |
| 4,598,340 | A | * | 7/1986 | Dwosh et al. ............ 362/98 |
| D292,236 | S | | 10/1987 | Caldwell |
| 4,931,917 | A | | 6/1990 | Scherf et al. |
| 5,149,282 | A | * | 9/1992 | Donato et al. ........... 439/530 |
| 5,169,226 | A | * | 12/1992 | Friedman ................ 362/190 |
| 5,211,365 | A | | 5/1993 | Melzian |
| 5,333,103 | A | * | 7/1994 | Cvek ..................... 362/413 |
| 5,541,822 | A | * | 7/1996 | Bamber .................. 362/190 |
| 5,716,121 | A | * | 2/1998 | Dubois .................. 362/198 |
| 5,993,022 | A | * | 11/1999 | Neyer et al. ............. 362/199 |
| 6,142,644 | A | * | 11/2000 | Leung .................... 362/98 |
| D435,677 | S | | 12/2000 | Hollinger |
| 6,158,874 | A | * | 12/2000 | Brustein et al. ......... 362/184 |
| 6,168,292 | B1 | | 1/2001 | Sherman |
| 6,200,001 | B1 | * | 3/2001 | Tin Shun Victor ....... 362/642 |
| 6,257,745 | B1 | * | 7/2001 | Speth et al. ............. 362/488 |

(Continued)

*Primary Examiner* — Jong-Suk (James) Lee
*Assistant Examiner* — David J Makiya
(74) *Attorney, Agent, or Firm* — Drinker Biddle & Reath LLP

(57) ABSTRACT

The present invention provides a lighting apparatus with an elongated housing which accommodates a light source. The housing may be pivoted to rotate between a stored position and a deployed position. The housing may be maintained at a plurality of desired positions within its range of rotation. In addition, according to a feature of the invention, the elongated housing may be relatively rigid, yet also articulated, so that it can flex transversely in response to an applied force. In an embodiment, the housing may be provided with a swivel portion that can be used to change the direction of the light. Various electrical features may be provided as well, such as a brightness control feature and an auto-off feature that switches off the light in the stowed position.

25 Claims, 14 Drawing Sheets

U.S. PATENT DOCUMENTS

| | | | | |
|---|---|---|---|---|
| 6,260,985 B1 * | 7/2001 | Zeller | | 362/202 |
| 6,361,184 B1 * | 3/2002 | Hallgrimsson et al. | | 362/188 |
| 6,419,370 B1 * | 7/2002 | Chen | | 362/98 |
| D473,669 S | 4/2003 | Hille et al. | | |
| 6,601,967 B1 * | 8/2003 | Zeller | | 362/116 |
| 6,641,279 B1 * | 11/2003 | Williams | | 362/184 |
| 6,736,531 B2 * | 5/2004 | Wallach | | 362/414 |
| D495,082 S | 8/2004 | Marchand | | |
| 6,902,200 B1 | 6/2005 | Beadle | | |
| 6,905,223 B2 * | 6/2005 | Halasz | | 362/197 |
| 6,953,260 B1 * | 10/2005 | Allen | | 362/194 |
| 6,957,897 B1 * | 10/2005 | Nelson et al. | | 362/184 |
| 6,986,590 B1 * | 1/2006 | Padden | | 362/197 |
| 7,163,306 B1 * | 1/2007 | Major et al. | | 362/98 |
| 7,344,270 B2 * | 3/2008 | Kim | | 362/205 |
| 7,572,024 B2 * | 8/2009 | Ko et al. | | 362/92 |
| 2003/0179572 A1 * | 9/2003 | Schnell | | 362/191 |
| 2004/0190282 A1 * | 9/2004 | Hussaini et al. | | 362/109 |
| 2005/0122710 A1 | 6/2005 | Kim | | |
| 2005/0122714 A1 * | 6/2005 | Matthews et al. | | 362/206 |
| 2005/0155597 A1 * | 7/2005 | Wolter et al. | | 126/25 R |

* cited by examiner

LIGHTING APPARATUS

CROSS-REFERENCE TO RELATED PATENT APPLICATIONS

This patent application claims the benefit of U.S. Provisional Patent Application No. 60/617,411, filed Oct. 8, 2004, which is herein incorporated by reference.

FIELD OF THE INVENTION

This invention pertains to a lighting apparatus. More particularly, this invention relates to a lighting apparatus that is adjustable, durable, and stowable.

BACKGROUND OF THE INVENTION

Many passenger vehicles include light sources for passenger use. For example, reading lights are frequently included in automobiles, buses, trains, and aircraft. In most passenger vehicles the light sources for passengers are provided overhead. Overhead lighting also is typically used to provide light for seating areas in situations outside of passenger vehicles, e.g., at a desk. In passenger vehicles, light sources are frequently individual overhead lights designed to provide light only for the person seated below the light. Problems exist with such individual overhead lights. For example, they generally have a very limited range of movement and/or adjustment and are generally not easily accessible by passengers.

Lighting fixtures having flexible arms coupled to a light source such as an incandescent light bulb, a light-emitting diode (LED), or a fiber optic light were developed in an effort to improve upon the available overhead lights. For example, U.S. Pat. No. 6,168,292 discloses a conventional flexible-arm lighting fixture. When used in passenger vehicles, lights on flexible arms are typically attached to the seat or cabinetry. Flexible arm lighting fixtures solve the mobility problems related to the overhead lights; however, they also present new problems. For example, flexible arm lighting fixtures are not as aesthetically pleasing as the overhead lights, and flexible arms typically are unable to maintain a desired position. In addition, they can be noisy and difficult to stow away.

Some of the problems with the flexible arm lighting fixtures can be addressed. For example, the noise produced by the flexible arm can be reduced or eliminated by adding a lubricant to the flexible arm. This solution, however, creates additional problems in keeping the flexible arm in the desired position and can cause unwanted movement of the arm. There is therefore a need to provide attractive lighting for seating areas that is easily adjustable and that will stay in a desired location without making excessive noise or being difficult to stow away.

BRIEF SUMMARY OF THE INVENTION

The present invention provides a lighting apparatus with an elongated housing which accommodates a light source. The housing may be pivoted to rotate between a stored position and a deployed position. In addition, according to a feature of the invention, the elongated housing may be relatively rigid, yet also articulated, so that it can flex transversely in response to an applied force. For example, the housing would flex transversely if it were bumped or jarred by a passenger or other object.

The housing may be provided with a swivel portion that can be used to change the direction of the light. Various electrical features may be provided as well, such as an auto-off feature that switches off the light in the stowed position, and a dimmable feature. The housing may be adjusted and maintained at a plurality of desired positions through the interaction of a plurality of detents and complementary recesses or notches.

In an embodiment, an advantage of the present invention is that it provides a quiet lighting apparatus that is capable of remaining in a fixed position. The lighting apparatus also improves the appearance of the cabin by providing a stowed position for unused lights.

These and other advantages of the invention will be apparent from the description of the invention provided herein.

DETAILED DESCRIPTION OF THE INVENTION

The present invention will now be described more fully with reference to the accompanying drawings in which exemplary embodiments of the invention are shown.

Figure 1A:
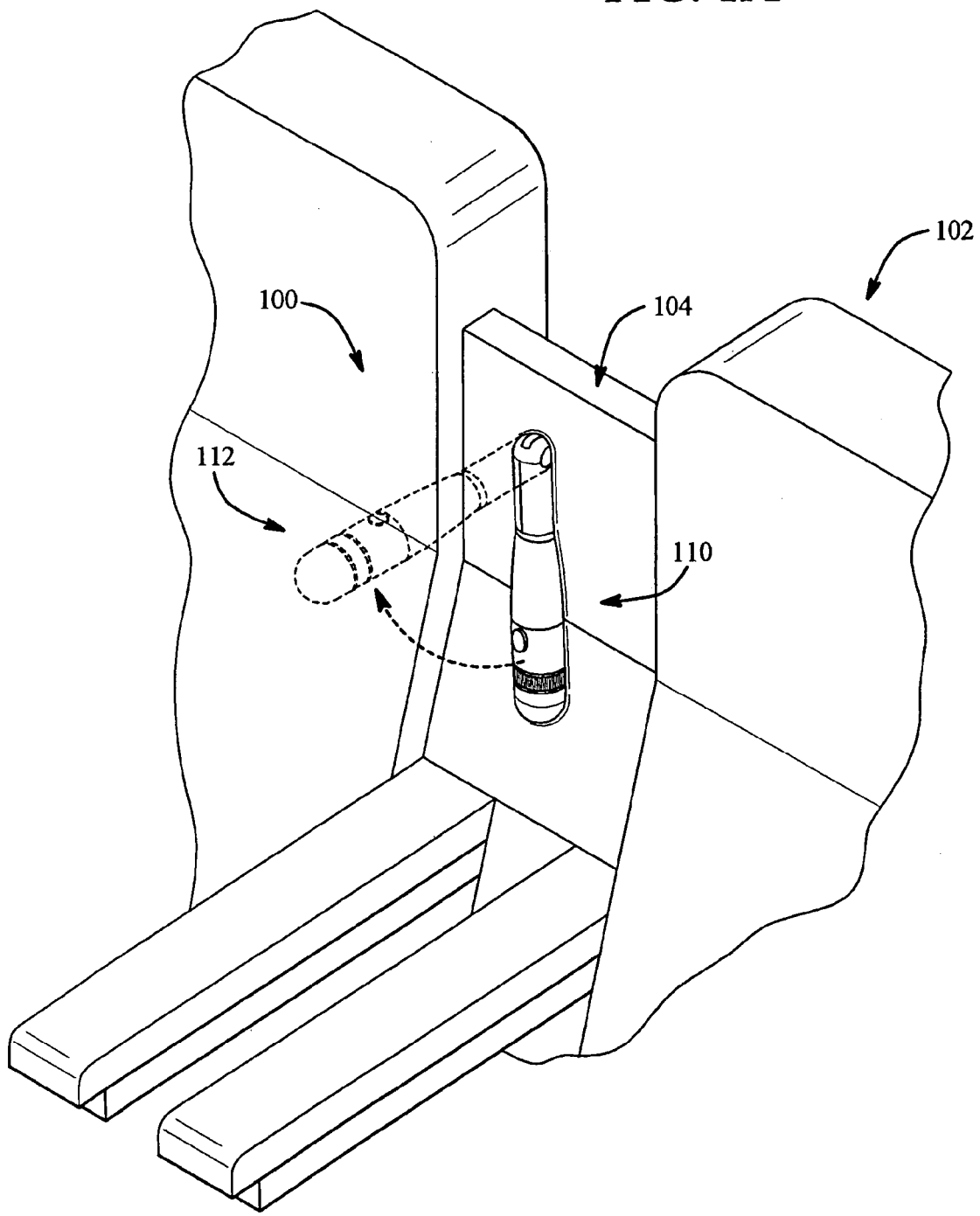
FIG. 1A is a perspective view illustrating a stowed position and a deployed position of a lighting apparatus attached to a seating apparatus according to an embodiment of the present invention.

As shown in FIGS. 1A-10, various embodiments of the present invention provide a lighting apparatus 100. In an embodiment, the lighting apparatus 100 may be coupled to a seating apparatus 102. For example, in an embodiment, the lighting apparatus 100 may be used with a seating apparatus 102 on a passenger vehicle such as an airplane, bus, yacht, or automobile. The lighting apparatus 100 may be coupled to the seating apparatus 102 in any suitable location. For example, in an embodiment, the lighting apparatus 100 may be coupled to a seat shell portion 104 of the seating apparatus 102, as shown in FIG. 1A. The lighting apparatus 100 may also be coupled to a seat back 106 to provide light for a passenger in the row behind the seat, as shown in FIG. 1B, or to a seat side 108 wherein the deployed lighting apparatus 100 provides light from over a passenger's shoulder, as shown in FIG. 1C. In various other embodiments, the lighting apparatus 100 may be coupled to the seating apparatus 102 in other locations such as the top and the arm. The lighting apparatus 100 may also be coupled to a wall or to a piece of furniture other than a seating apparatus 102, such as a desk or table.

Figure 1B:
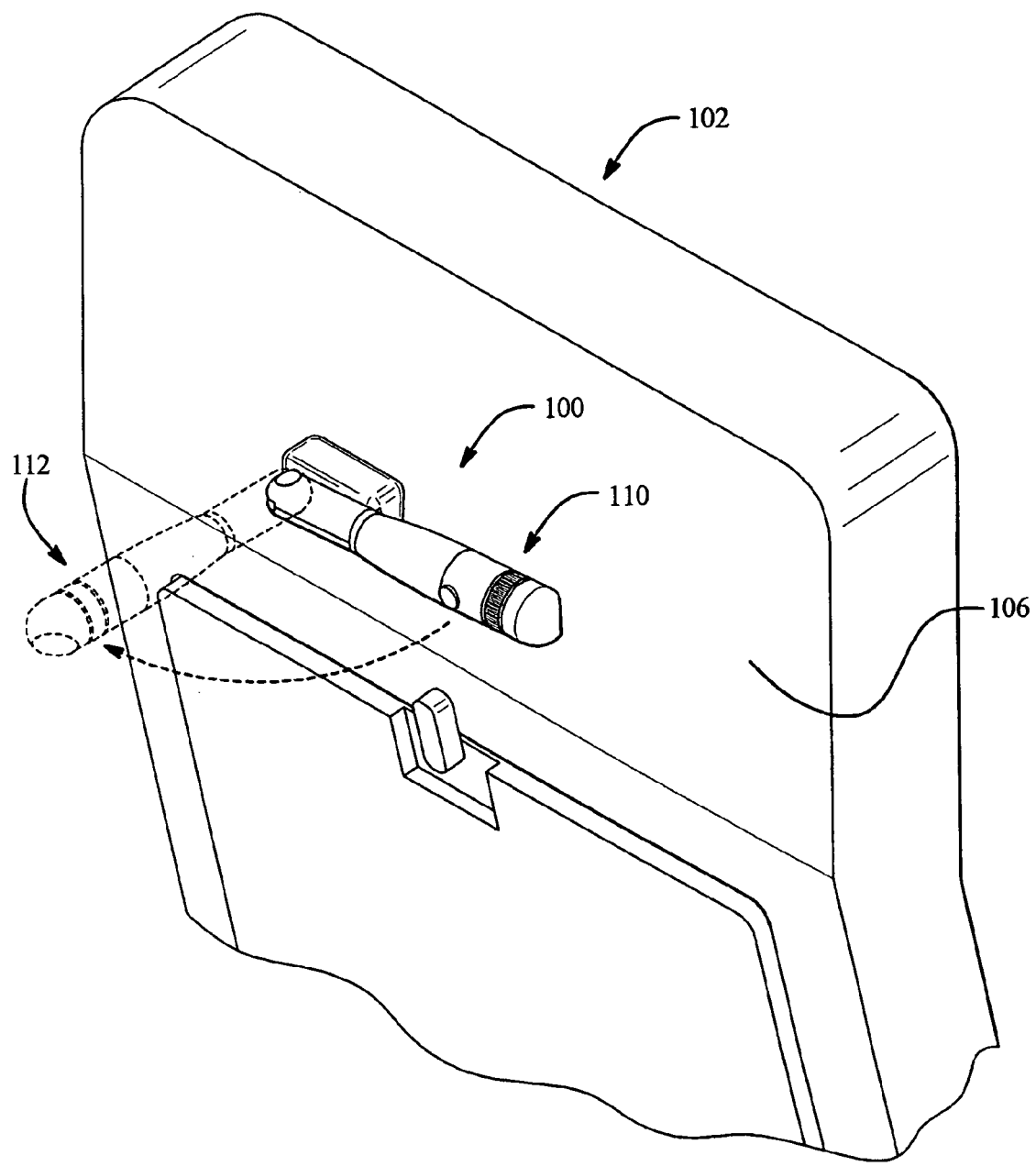
FIG. 1B is a perspective view illustrating a stowed position and a deployed position of a lighting apparatus attached to a seating apparatus according to another embodiment of the present invention.
Figure 1C:
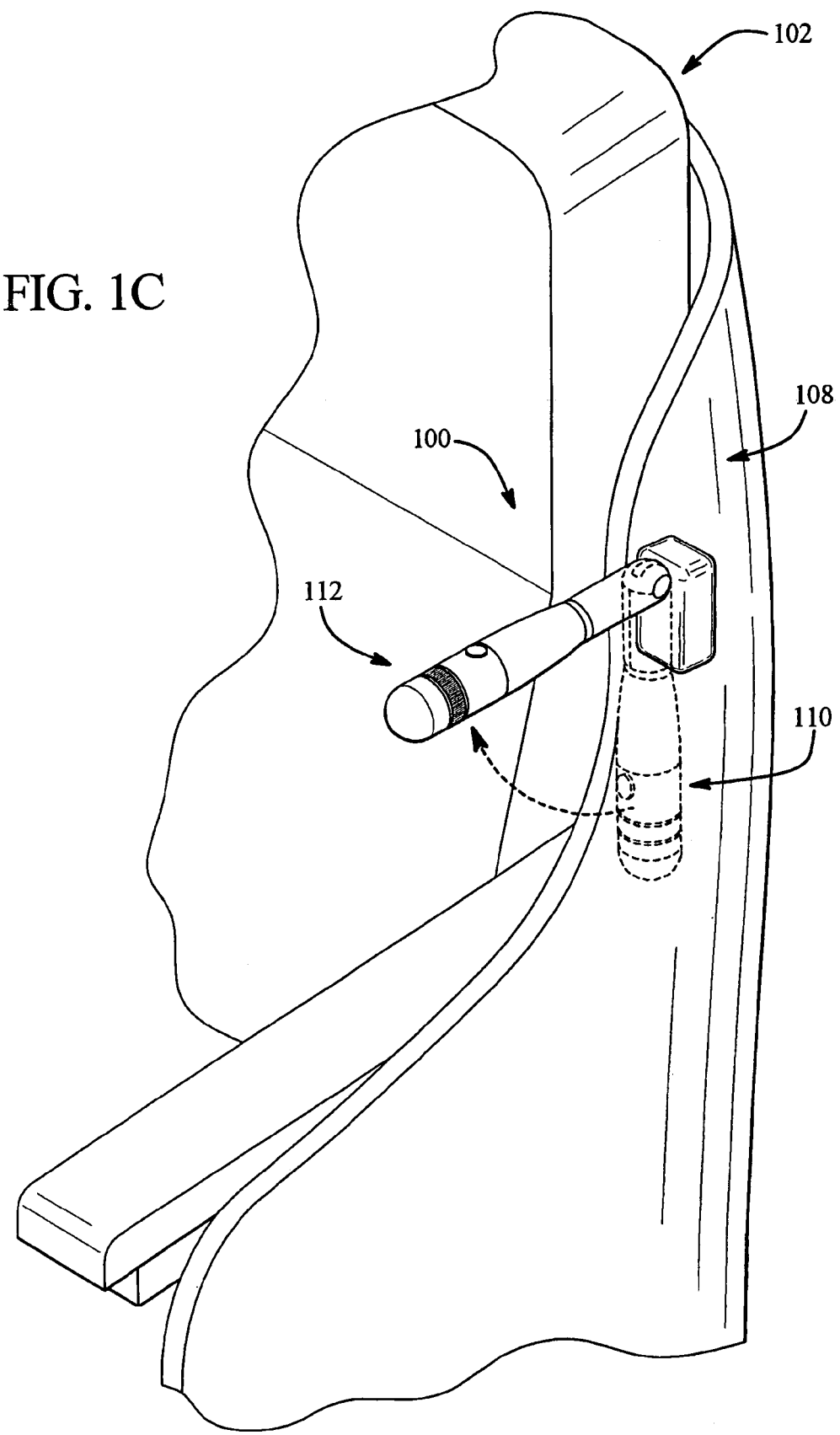
FIG. 1C is a perspective view illustrating a stowed position and a deployed position of a lighting apparatus attached to a seating apparatus according to another embodiment of the present invention.
Figure 2:
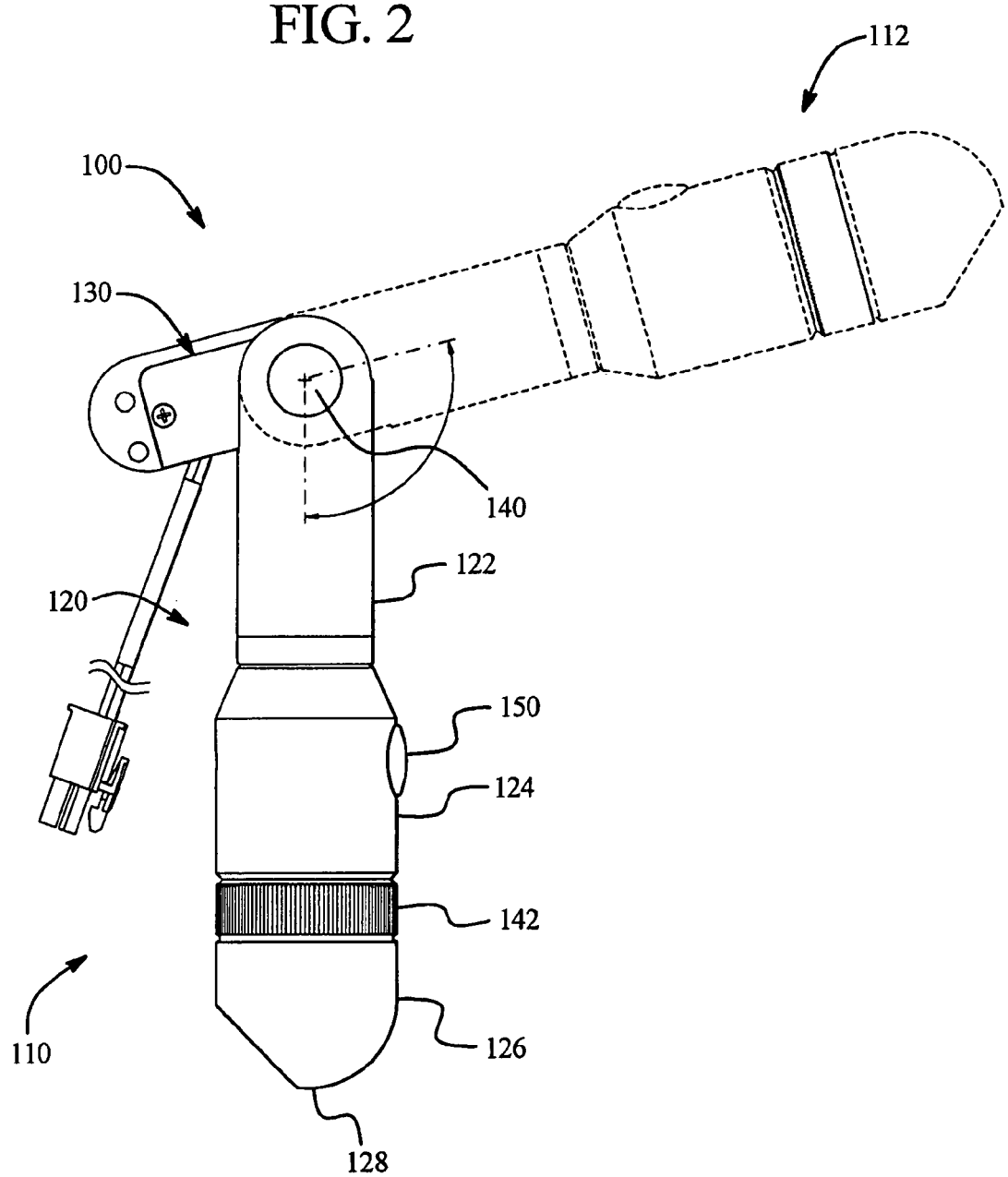
FIG. 2 is a side view of a lighting apparatus according to an embodiment of the present invention.
Figure 3:
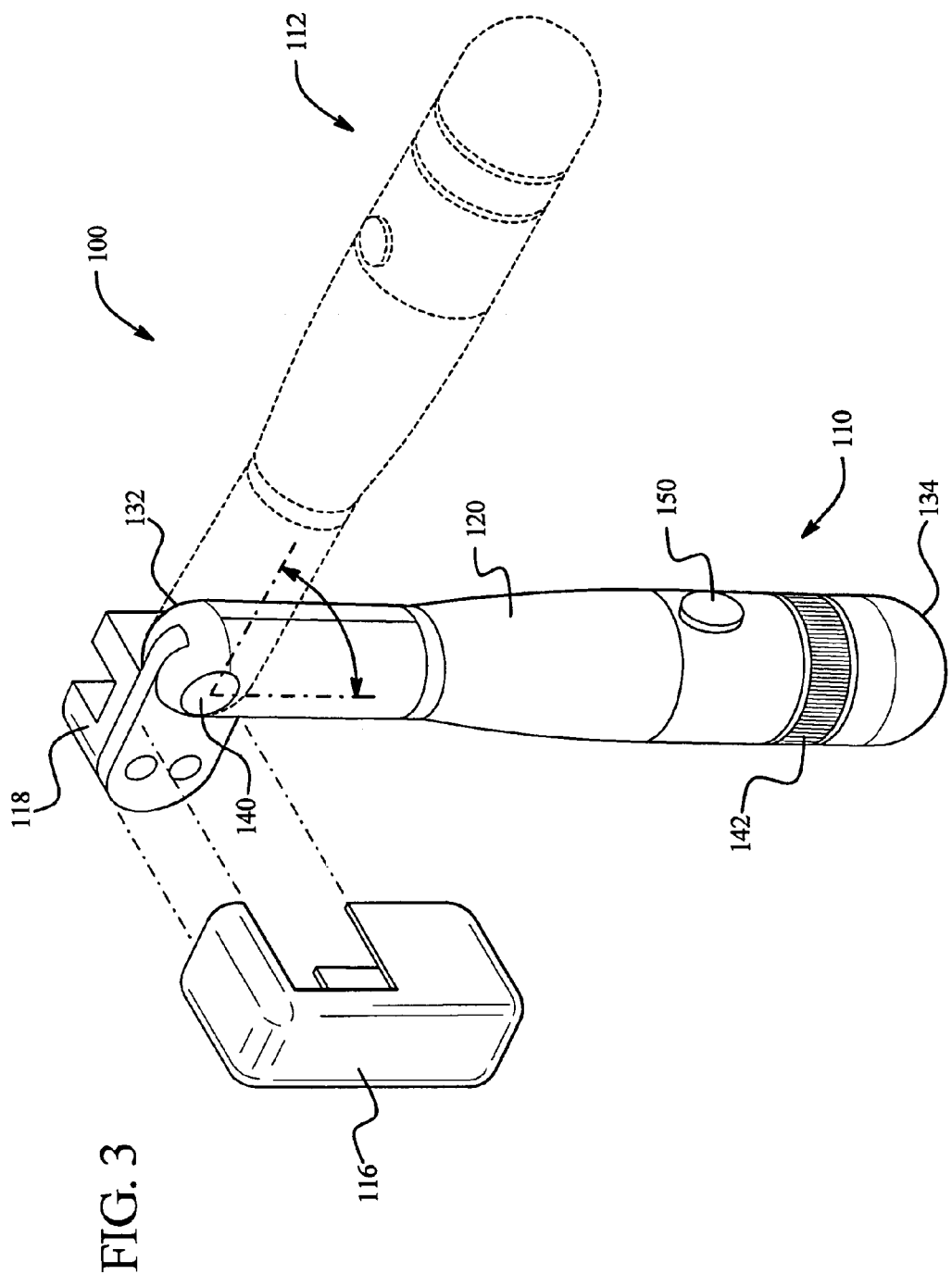
FIG. 3 is a perspective view of a lighting apparatus according to another embodiment of the present invention.

As shown in FIGS. 1A-1C, various embodiments of the present invention provide a lighting apparatus 100 coupled to a seating apparatus 102, wherein the lighting apparatus 100 is movable about a pivot member 140 or hinge arm 130 between a stowed position 110 and a deployed position 112 (shown in FIG. 1C and in phantom in FIGS. 1A, 1B, 2, and 3). In the stowed position 110, the lighting apparatus 100 may be at least partially recessed into the mounting surface, as shown in FIG. 1A, or may protrude from the mounting surface, as shown in FIGS. 1B and 1C. As shown in FIGS. 2-3, the lighting apparatus 110 may be provided either with or without a mounting block 118. In an embodiment of a lighting apparatus 100 without a mounting block 118 (FIG. 2), a housing 120 is coupled to a seating apparatus 102 or other surface via a pivot member 140 or rotating member such as a hinge arm 130. In an embodiment of a lighting apparatus 100 including a mounting block 118 (FIG. 3), the housing 120 is coupled to the mounting block 118, which, in turn, is coupled to the seating apparatus 102. The mounting block 118 may be covered by a mounting block cover 116 (FIG. 3). In various embodiments, the housing 120 or mounting block 118 can be attached to a seating apparatus 102 at any desired location including, but not limited to, the seat, the seat shell 104, the seat side 108, the arm, or the back 106. The mounting block 118 extends the distance from the mounting surface to the centerline or primary axis of the lighting apparatus 100 and is particularly useful when the lighting apparatus 100 is mounted on the side 108 of the seat.

Figure 4:
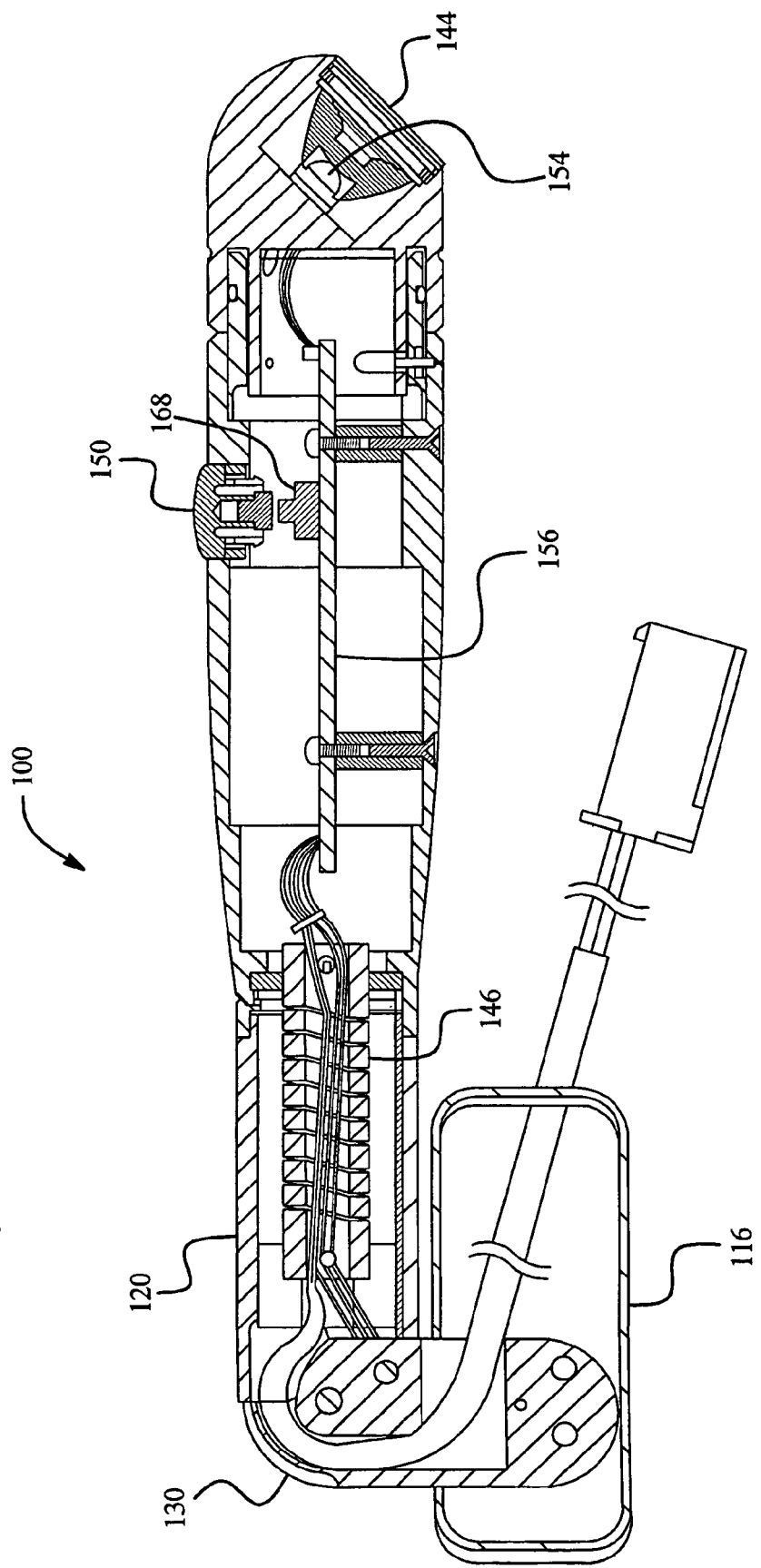
FIG. 4 is a cross-sectional view of a lighting apparatus according to an embodiment of the present invention.

In an embodiment, as shown in FIGS. 2 and 4, the lighting apparatus 100 comprises a substantially rigid elongated housing 120 with a rotatable end 128, a light source 154 disposed within the housing 120, a hinge arm 130 that allows pivotable movement of the housing 120, and a finger grip 142 for rotating the rotatable end 128. In an embodiment, the housing comprises three sections extending along a shared axis, wherein the first and second sections 122, 124 are at least partially transversely flexibly coupled to each other and the third section 126 is at least partially rotatably coupled to the second section. In an embodiment, the hinge arm 130 is disposed within the first section 122 of the housing 120 and is located distal to the second section 124. In an embodiment, the lighting apparatus 100 includes a button 150 for controlling the lighting apparatus 100.

Figure 5:
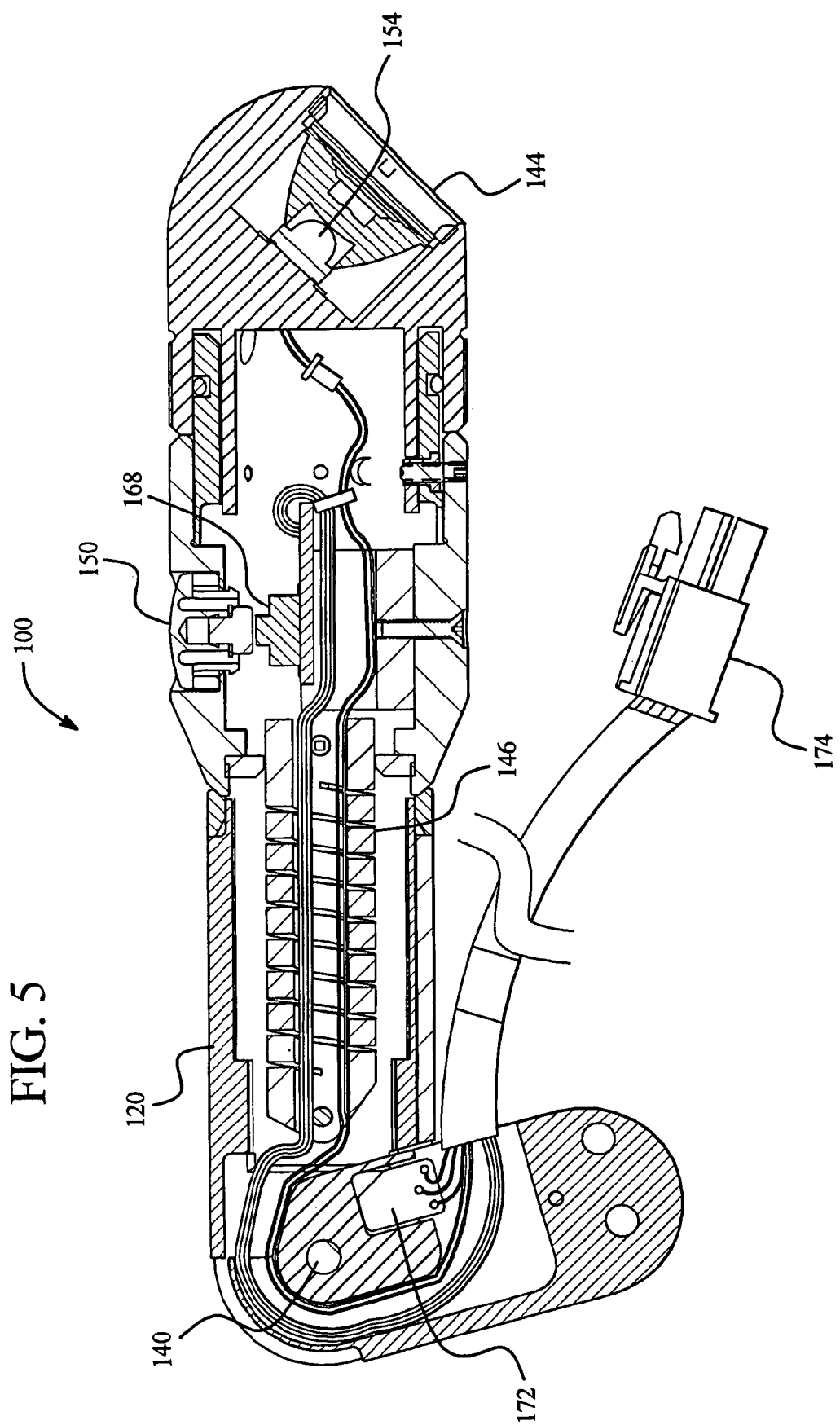
FIG. 5 is a cross-sectional view of a lighting apparatus according to an embodiment of the present invention.

In another embodiment, as shown in FIGS. 3 and 5, the lighting apparatus 100 comprises a light source 154, an elongated housing 120 in which the light source 154 is disposed, and a pivot member 140 coupled to the housing 120 that allows the housing 120 to rotate from a stowed position 110 to a deployed position 112. In an embodiment, the housing 120 is substantially rigid. In an embodiment, the housing 120 has a first end 132 and a second end 134, and light emitted from the light source 154 exits the housing through the second end 134. In an embodiment, the first end 132 is coupled to a mounting block 118. In an embodiment, the pivot member 140 is proximate to the first end 132 of the housing 120 and rotatably couples the first end 132 of the housing 120 to a seating apparatus 102. In an embodiment, the second end 134 of the housing is rotatable. In an embodiment, the lighting apparatus 100 includes a button 150 for controlling the lighting apparatus 100.

The light source 154 may be any suitable source of illumination, including, but not limited to, an LED and an incandescent lamp. The housing may be fabricated of any suitable material. In an embodiment, the housing may comprise metal such as aluminum or stainless steel. In another embodiment, it may comprise a plastic material.

Figure 11:
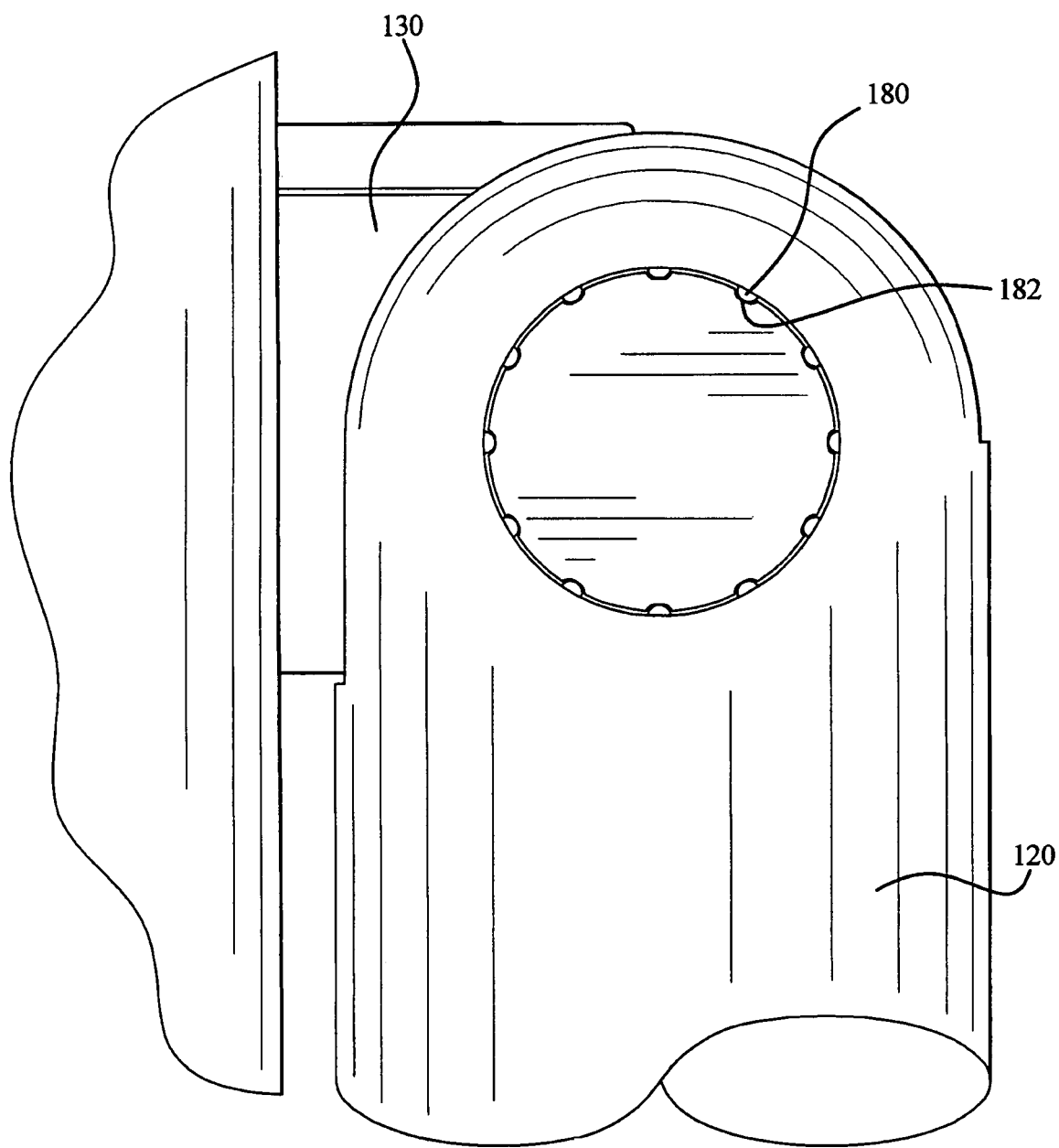
FIG. 11 is a perspective view of supports used in a lighting apparatus according to an embodiment of the present invention.

As shown in FIGS. 2-3, in a first position, the lighting apparatus 100 is in a stowed position. Depending on the placement of the mounting block 118 and/or the housing 120 on the seating apparatus 102, the stowed lighting apparatus 100 may be entirely removed from the seating area so as not to be an impediment to passenger movement. In a second position, the housing 120 is in a deployed position 112 to be used when the lighting apparatus is in use by a passenger. The housing may be rotated between the stowed and deployed positions 110, 112, and the housing 120 may be maintained at at least one angular partially-deployed position between the stowed position 110 (e.g., approximately 0 degrees) and the deployed position 112 (e.g., approximately 90 to 120 degrees from the support arm). Detents or other supports may be used to maintain the housing 120 in the partially-deployed or deployed positions 112. In an embodiment, as shown in FIG. 11, detents 180 with complementary notches 182 urge the housing 120 into at least one position within the range of rotation. In various embodiments, the deployed position 112 is at an angular position greater than or less than 90 degrees. In an embodiment, the lighting apparatus 100 pivots in the same manner both with and without a mounting block 118. As will be appreciated by one of ordinary skill in the art, there are a number of different structures or methods that could be used to maintain the housing 120 at various positions within the range of rotation. Any such structure or method may be used without departing from the scope and spirit of the invention.

Figure 6A:
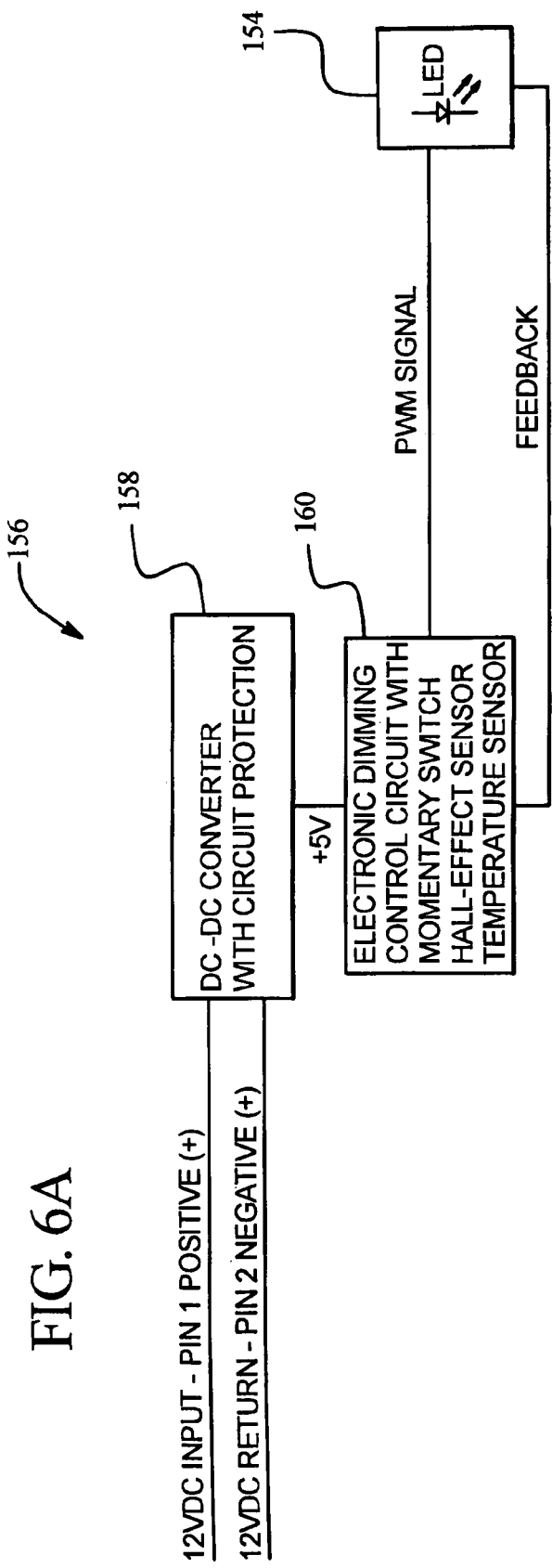
FIG. 6A is a block diagram illustrating the power/drive portion of a lighting apparatus according to an embodiment of the present invention.
Figure 6B:
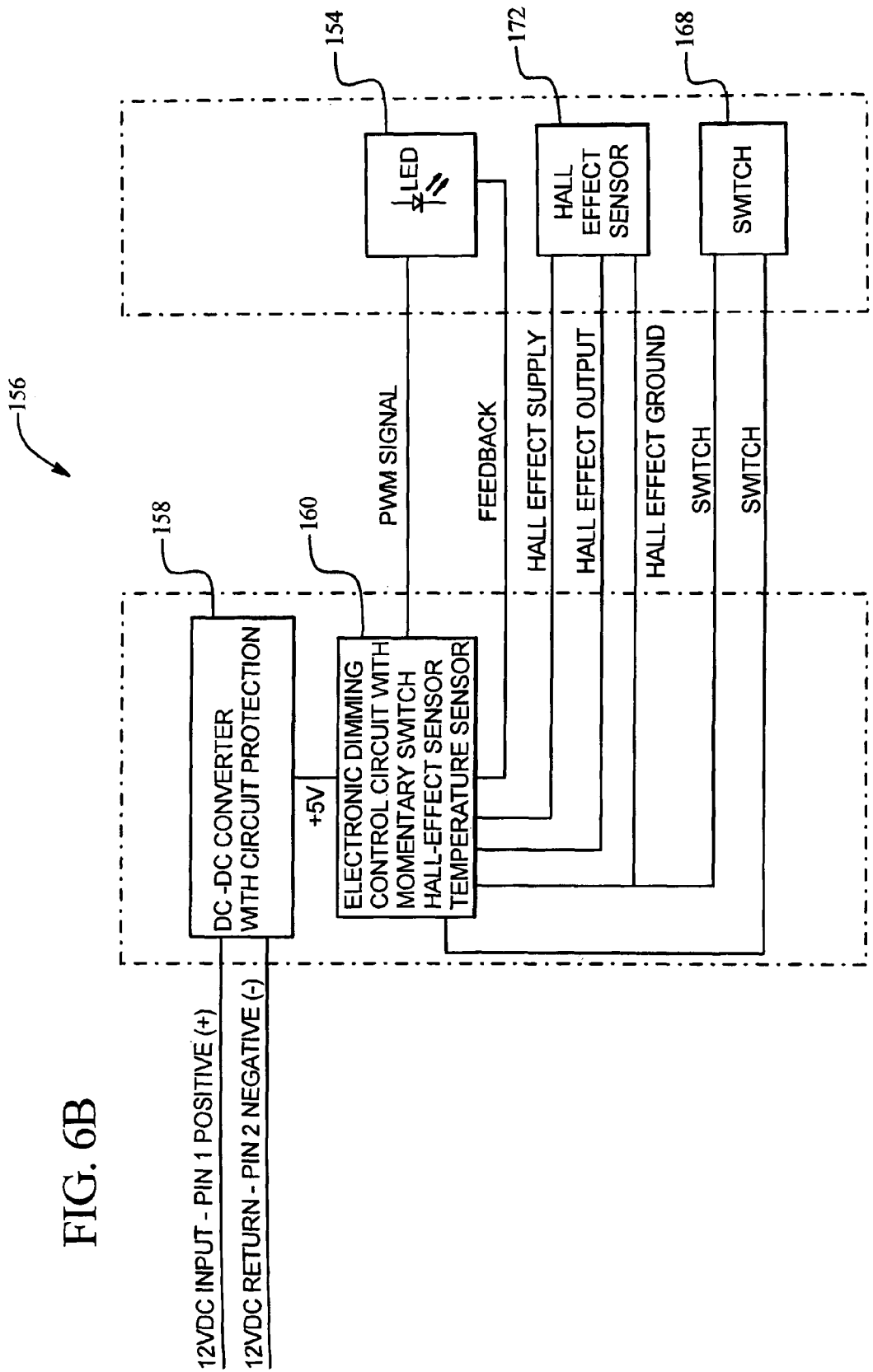
FIG. 6B is a block diagram illustrating the power/drive portion for a lighting apparatus according to another embodiment of the present invention.
Figure 7:
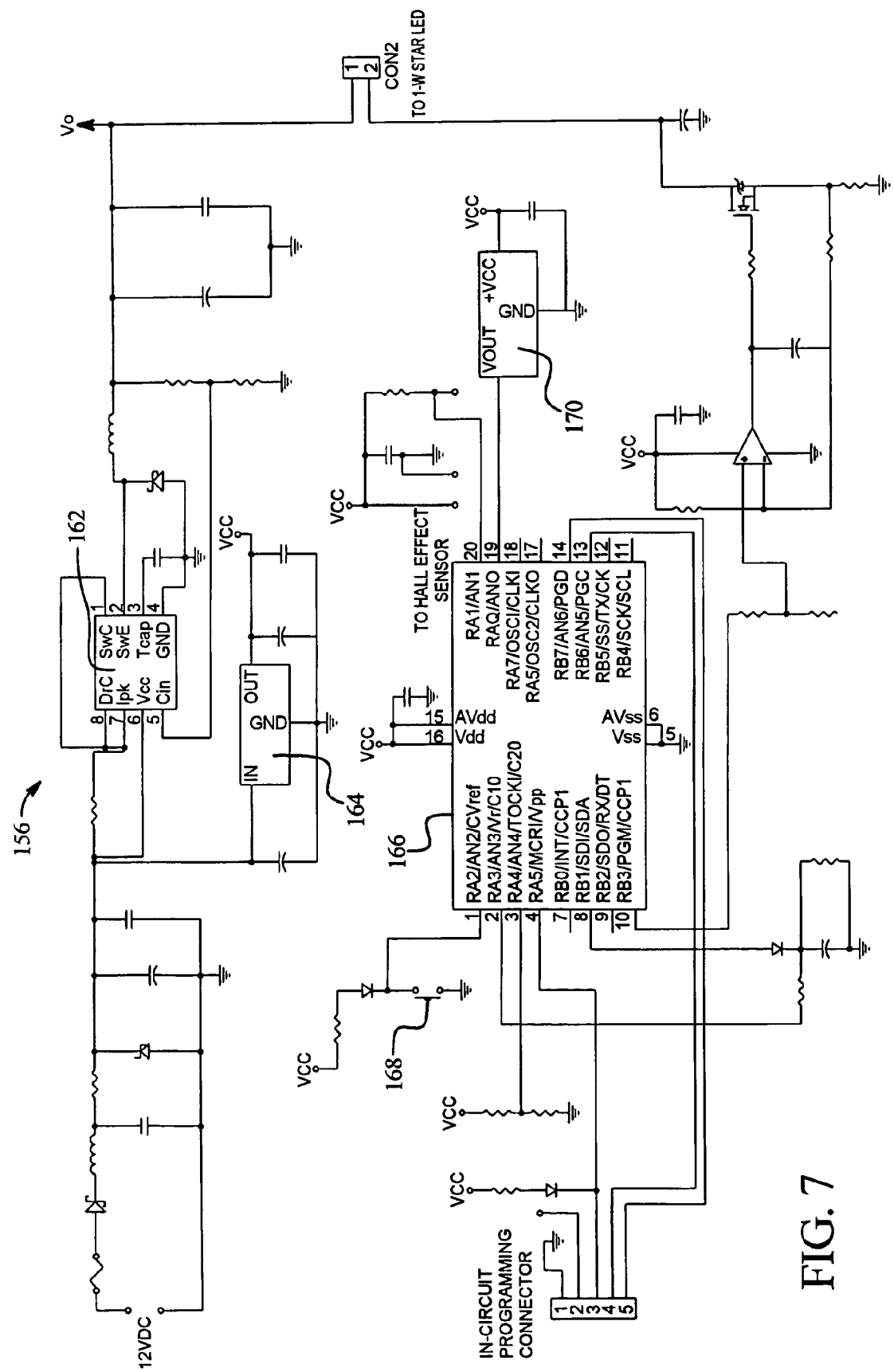
FIG. 7 is a schematic diagram of the electrical circuitry for a lighting apparatus according to an embodiment of the present invention.

Any suitable circuitry for providing power to and driving a light source 154 may be used. In an embodiment, as shown in FIGS. 6A and 6B, the light source 154 is coupled to power/drive circuitry 156 comprising a power converter 158 and an electronic dimming control circuit 160 including a momentary switch, a Hall-effect sensor, and a temperature sensor. FIG. 7 is a circuit diagram of an embodiment of power/drive circuitry 156 having a power converter 158 and an electronic dimming control circuit 160. As shown in FIG. 7, the power converter 158 may include a DC-DC converter 162, a voltage regulator 164, and supporting and protective circuitry. The electronic dimming control circuit 160 may include a processor 166 such as a PIC 16F88 for controlling the operating of the light source 154, a switch 168, a temperature sensor 170, a Hall-effect sensor 172 (see FIG. 5), and supporting circuitry. In an embodiment, the power/drive circuitry 156, the light source 154 is controlled by a PWM signal from the processor 166. Further details regarding this circuitry will be described below.

In an embodiment, as shown in FIGS. 4 and 6A, the power/drive circuitry 156 is located within the housing 120. In another embodiment, as shown in FIGS. 5 and 6B, the power/drive circuitry 156 may be located outside of the housing 120 and is electrically coupled to the light source 100 via a connector 174. Locating the power/drive circuitry 156 outside the housing 120 allows for a shorter housing 120 than when the power/drive circuitry 156 is located within the housing 120. In an embodiment in which the power/drive circuitry 156 is located within the housing 120, the lighting apparatus 100 may use efficient heat transfer inside the housing to protect any electronics from excessive temperature rise.

In an embodiment, the lighting apparatus 100 includes an auto-off circuit. In an embodiment, the auto-off circuit comprises a sensor for detecting when the housing 120 is approximately in the stowed position 110, and the light source 154 is turned off when the lighting apparatus 100 is moved from the deployed position 112 to the stowed position 110 or proximate thereto. In an embodiment, as shown in FIG. 5, the auto-off circuit in the lighting apparatus includes a Hall-effect sensor 172 near the pivot member 140 or hinge arm 130. Various other auto-off circuits may also be used. For example, in an embodiment, the auto-off circuit comprises a timer that turns off the light source 154 after it has been on for a specified length of time. In an embodiment, the auto-off circuit may also deactivate the light source 154 if the temperature sensor 170 (see FIG. 7) senses that the lighting apparatus 100 is overheating.

In an embodiment, the lighting apparatus 100 includes a switch 168 electrically coupled to the light source 154, as shown in FIG. 7. The switch 168 turns the light source 154 on and off. In an embodiment, as shown in FIGS. 1A-5 and 10, the housing 120 has an opening through which a button 150 coupled to the switch 168 is accessible.

Figure 9:
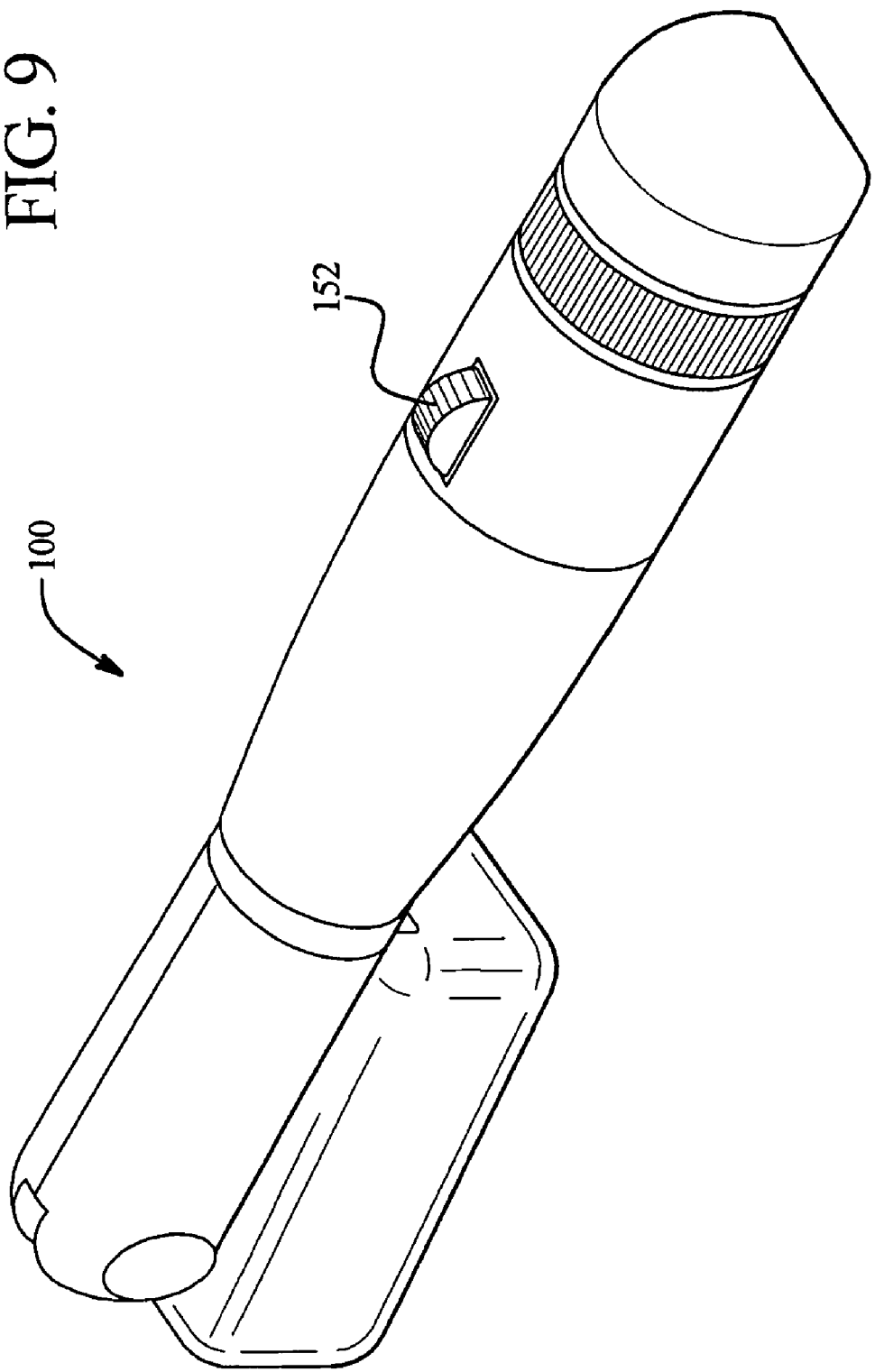
FIG. 9 is a perspective view of a lighting apparatus according to an embodiment of the present invention.

In an embodiment, an intensity or brightness level of the light source 154 may be adjusted. Any suitable circuitry and components for increasing and dimming the brightness of the light source 154 may be used. For example, a single-button control method may be used to select a brightness level. The single-button control method uses the button 150, which is used to turn the lighting apparatus 100 on and off, to also control the brightness. In an embodiment of the single-button control method, the brightness levels may be programmed into a processor 166 that is electrically coupled to the light source 154, as shown in FIGS. 6A, 6B, and 7. The brightness levels may range from approximately off through approximately fully on. A brightness level may be chosen by successively pressing the button 150. In another embodiment, the lighting apparatus 100 includes at least two buttons for setting a brightness level. The two buttons may, for example, set a "high" light level and a "low" light level. In another embodiment, the two buttons may be "up" and "down" buttons for adjusting the brightness level of the light source 154 between many brightness levels. In another embodiment, as shown in FIG. 9, a dimmer switch 152 such as a sliding switch or a thumbwheel switch is used to control the brightness level. Controlling the brightness level may include turning the lighting apparatus 100 on and off.

In an embodiment, the light source 154 is a light-emitting diode (LED). In an embodiment, the LED is placed near the second end 134 or in the third section 126 of the housing so as to point along an angle of approximately 45 degrees from the primary axis of the housing 120. Placing the LED at an angle of approximately 45 degrees substantially eliminates side projections and forward projections of light, both of which may be blocked by portions of a user's arm, thus preventing light from reaching a user's reading material. Using an LED in this manner also allows for a shorter housing 120. In other embodiments, the LED may be placed at angles greater or less than 45 degrees to compensate for the mounting location of the lighting apparatus 100 without departing from the scope and spirit of the invention.

In an embodiment, the lighting apparatus 100 emits a brighter light from a light source 154 comprising LEDs by efficiently transferring heat away from the LEDs. The LEDs may be soldered by their leads to a thin printed circuit board that has openings accommodating the metal back surface of each LED. The printed circuit board is then assembled onto the housing 120 such that back contacts are connected to mesas on the housing 120 that protrude through the openings in the printed circuit board. In an embodiment, the LEDs are adhered to the housing using a thin bond line of silicone adhesive. Other adhesives may also be used without departing from the scope and spirit of the invention.

Figure 8:
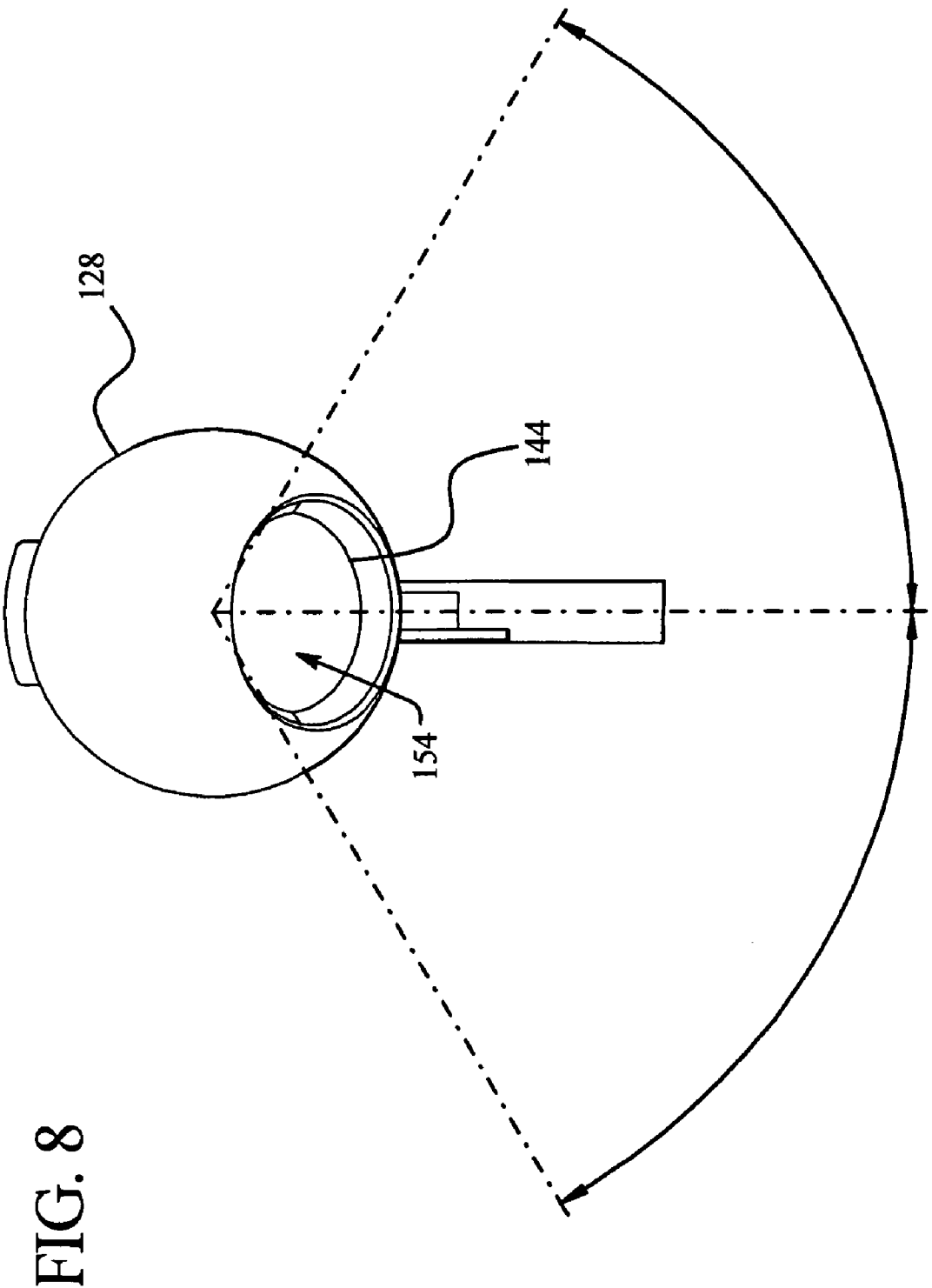
FIG. 8 is a perspective view of a rotatable portion of the housing of a lighting apparatus according to an embodiment of the present invention.

FIG. 8 is a perspective view of a rotatable portion 128 of the housing 120 of a lighting apparatus 100 according to an embodiment of the present invention. A portion of the housing 120 rotates, i.e., swivels, thereby allowing the user to change the direction in which light emitted from the light source 154 exits the housing 120. In an embodiment, the rotating portion 128 of the housing 120 is rotatable by approximately 60 degrees to the left or the right of the primary axis of the housing 120. In other embodiments, the rotating portion 128 may rotate less or more than 60 degrees, and may even rotate 360 degrees. In an embodiment, the rotating portion 128 of the housing 120 has a beveled surface 144 through which the emitted light exits the housing. In an embodiment, the beveled surface 144 has an angle of approximately 45 degrees. The beveled surface 144 may be at a greater or lesser angle than 45 degrees. The beveled surface 144 can help direct the light from the light source 154, and the rotation of the rotating portion 128 of the housing 120 by the passenger can help further direct the light in a desired direction. The rotatable portion 128 may include a gripping portion 142 (see FIGS. 2-3). The gripping portion 142 may comprise a scored area of the housing 120.

Figure 10:
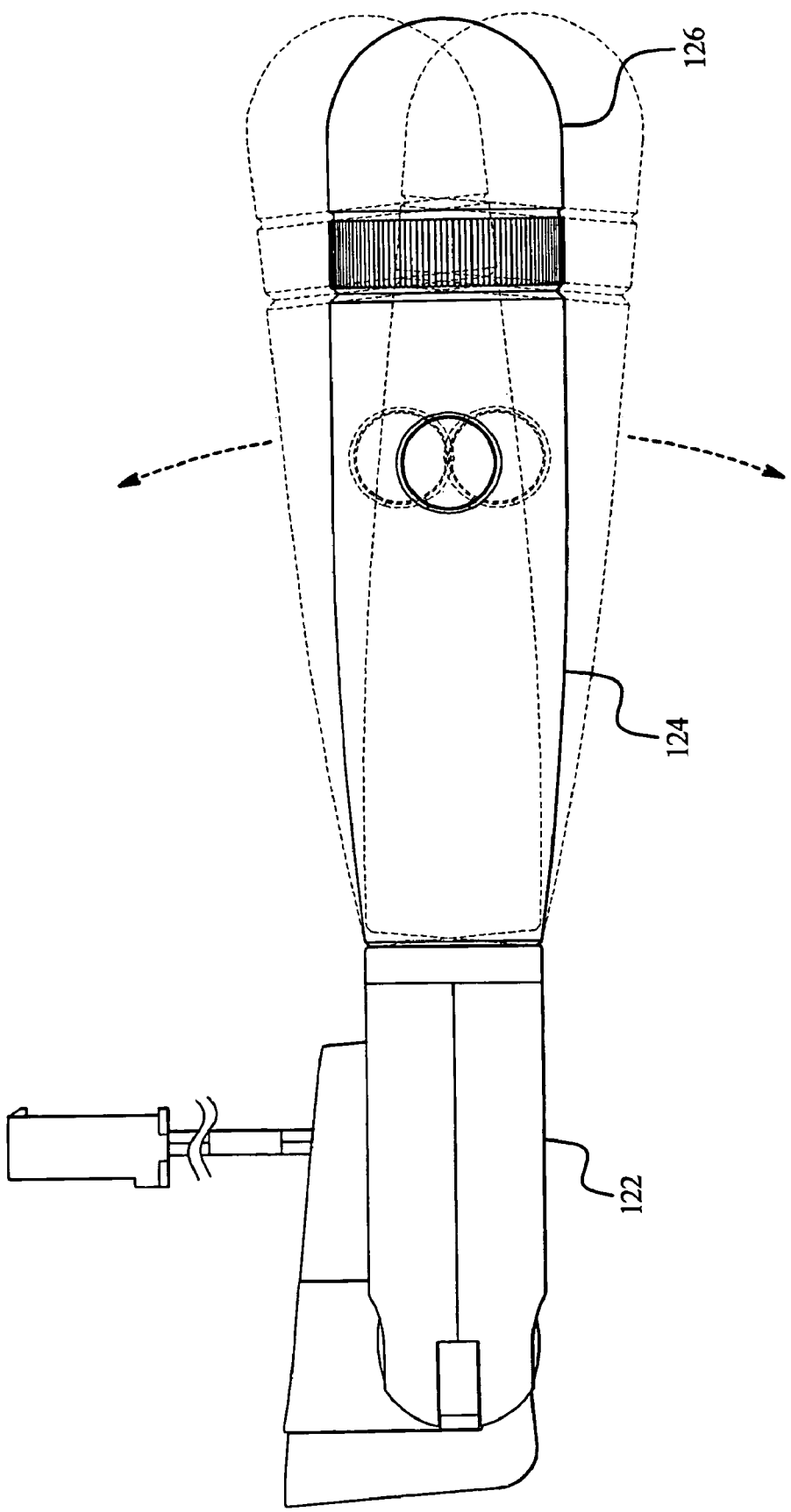
FIG. 10 is a perspective view of a lighting apparatus according to an embodiment of the present invention.

In an embodiment, the lighting apparatus 100 may protrude some distance from its mounting surface, e.g., a seat shell 104 or seat back 106, when in the deployed position 112. As a result, a passenger or piece of luggage may strike the lighting apparatus 100 while it is deployed. If the lighting apparatus 100 does not move when force is applied to it if, for example, a passenger falls against the lighting apparatus 100, the passenger may be injured, and the lighting apparatus 100 may be damaged. As shown in FIGS. 4-5 and 10, the lighting apparatus 100 may be articulated and include a resilient element 146 such as a heavy-duty spring that allows a portion of the lighting apparatus 100 to flex when force is applied to it. For example, if the lighting apparatus 100 is installed on a passenger vehicle and a passenger strikes it, part of the lighting apparatus 100 may flex away from the impact. The flexing response of the lighting apparatus 100 may occur in both the stowed position 110 and the deployed position 112. The resilient element 146 may be coupled to the housing 120, and when impacted, the first section 122 remains substantially in place while the second and third sections 124, 126 of the housing 120 flex transverse to the axis that they share with the first section 122. When the force is removed, the second and third sections 124, 126 return to their original positions. Although FIG. 10 illustrates this motion from an overhead view of the lighting apparatus 100, this motion is not limited to such a view. Similar motion could also be viewed from the side of the lighting apparatus 100.

The lighting apparatus 100 may be constructed of flame resistant materials compliant with aviation requirements. It may also be constructed to satisfy EMI and environmental requirements and to comply with RTCA DO-160D.

In an embodiment, the housing 120 may be primarily tubular in shape and the end section containing the light source 154 may be partially spherical in shape. In one embodiment, as shown in FIGS. 3 and 4, the housing 120 of the lighting apparatus 100 is approximately 8 and ½ inches long and is 1 and ⅜ inches in diameter, at its widest diameter. In another embodiment, as shown in FIGS. 2 and 5, the housing 120 of the lighting apparatus 100 is approximately 6 inches long and is 1 and ⅜ inches in diameter, at its widest diameter. The length and shape of the housing 120, however, can be modified to accommodate design and space needs without departing from the scope and spirit of the invention.

Overall the lighting apparatus 100 serves as a rugged, adjustable, and highly reliable source of light. Its packaging is uniquely adapted to the rigorous functional requirements of both commercial and business passenger aircraft use, while providing an improved aesthetic over existing products. The lighting apparatus 100 of the present invention improves passenger access to reading lights on a passenger vehicle. The lighting apparatus 100 is an improvement over conventional overhead reading lights because the lighting apparatus 100 moves the light source 154 and its positioning features closer to the passenger. In addition, by using a housing structure 120 to retain the light source 154 and fixing the angular position with detents or other supports, the lighting apparatus 100 avoids the noise and inability to remain in a fixed position that are associated with flexible arm lights.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A lighting apparatus comprising:
   a single dimmable light source, the intensity of the light source adjustable to at least two levels when the light source is activated;
   a substantially tubular elongated housing inside of which the light source is disposed on a center axis that extends substantially lengthwise inside the housing and substantially parallel to the housing, the housing having a first end and a second end, wherein the second end includes an opening, oriented at an angle from the center axis, through which light emitted from the light source exits the housing in a direction angular to the center axis, and the second end has a swivel portion rotatable at least partially around the center axis to change the direction the light exits the housing; and
   a pivot member coupled to the housing and adapted to mount to a mounting surface that allows the housing to rotate from a stowed position adjacent to the mounting surface to a deployed position protruding from the mounting surface, the pivot member including a support comprising a detent and a complementary notch that urge the housing in a direction of rotation and into at least one position within a range of rotation between the stowed position and the deployed position;
   wherein the first end and the second end are at least partially transversely flexibly coupled to each other;
   and further comprising an auto-off circuit, wherein the auto-off circuit switches off the light source when the housing is in the stowed position.

2. The lighting apparatus of claim 1, wherein the housing is substantially rigid.

3. The apparatus of claim 1, wherein a resilient element is coupled to the first and second ends of the housing and allows the second end to flex transversely away from the first end in response to an applied force.

4. The apparatus of claim 1, wherein the swivel portion includes a gripping portion.

5. The apparatus of claim 1, wherein the swivel portion includes a beveled surface through which light exits the housing.

6. The apparatus of claim 1, wherein the first end of the housing is coupled to a mounting block.

7. The apparatus of claim 1, wherein the light source has a plurality of selectable brightness levels.

8. The apparatus of claim 1, wherein the pivot member is proximate to the first end of the housing.

9. The apparatus of claim 1, wherein the pivot member rotatably couples the first end of the housing to a seat.

10. The apparatus of claim 1, wherein the housing is urged into a plurality of positions within the range of rotation.

11. A lighting apparatus comprising:
    a substantially cylindrical, rigid elongated housing, having first, second, and third sections extending in substantially the same direction along a center shared axis disposed lengthwise in the housing, wherein the first and second sections are at least partially transversely flexibly coupled to each other and the third section is at least partially rotatably coupled to the second section wherein the third section rotates at least partially around the shared axis;
    a single dimmable light source disposed within the housing, said light source disposed on the center shared axis extending lengthwise inside the housing, the light source oriented at an angle to the center shared axis and projecting a stream of light in an angle away from the center shared axis, the intensity of the light source adjustable to at least two levels when the light source is activated;
    a hinge disposed within the first section of housing and distal to the second section and adapted to mount to a mounting surface, the hinge allowing the housing to rotate from a stowed position adjacent to the mounting surface to a deployed position protruding from the mounting surface, the hinge including a support comprising a detent and a complementary notch that urge the housing in a direction of rotation and into at least one position within a range of rotation between the stowed position and the deployed position;
    a finger grip for gripping and rotating the third section; and further comprising an auto-off circuit, wherein the auto-off circuit comprises a sensor for detecting when the housing is approximately in the stowed position.

12. The apparatus of claim 11, further comprising a resilient element, wherein the resilient element is coupled to the housing and allows the second and third sections of the housing to flex transverse to the shared axis while the first section remains fixed along the shared axis.

13. The apparatus of claim 12, wherein the resilient element is a heavy-duty spring.

14. The apparatus of claim 11, wherein the third section includes a beveled portion distal to the second portion, wherein light emitted by the light source exits the housing through the beveled portion.

15. The apparatus of claim 11, wherein the light source is selected from the group consisting of a light-emitting diode and an incandescent lamp.

16. The apparatus of claim 11, further comprising a switch electrically coupled to the light source.

17. The lighting apparatus of claim 16, wherein the switch comprises a button for selecting an intensity level for light emitted from the light source.

18. The lighting apparatus of claim 17, wherein an intensity level is selected through successively pressing the button.

19. The lighting apparatus of claim 16, wherein the switch comprises a wheel for selecting an intensity level for light emitted from the light source.

20. The lighting apparatus of claim 11, wherein the sensor comprises a Hall-effect switch.

21. A lighting apparatus, the lighting apparatus comprising: a substantially cylindrical housing; a single dimmable light source, the intensity of the light source adjustable to at least two levels when the light source is activated, the light source disposed on a center axis extending lengthwise inside the housing; the housing having first end and a second end wherein the first end and the second end are at least partially transversely flexibly coupled to each other;
    means for mounting the housing to a mounting surface;
    means for urging the housing and the light source along a direction of rotation into a position between a stowed position adjacent to the mounting surface and a deployed position protruding from the mounting surface;
    means for maintaining the housing at least one desired rotational position; and means for rotating, at least partially around the center axis, a direction in which light emitted by the light source exits the housing; and
    further comprising means for deactivating the light source when the housing is proximate to the stowed position.

22. The apparatus of claim 21, further comprising means for adjusting a brightness level of the light source.

23. The lighting apparatus of claim 1, wherein the swivel portion rotates approximately 60° either side of the center axis.

24. The lighting apparatus of claim 11, wherein the third section rotates approximately 60° either side of the center shared axis.

25. The lighting apparatus of claim 21, wherein the means for rotating the direction in which light emitted by the light source exits the housing is capable of rotating approximately 60° either side of the center axis.

* * * * *